(12) United States Patent
Bloomcamp et al.

(10) Patent No.: US 9,173,238 B1
(45) Date of Patent: Oct. 27, 2015

(54) DUAL PATH IN-VEHICLE COMMUNICATION

(71) Applicant: Sprint Communications Company L.P., Overland Park, KS (US)

(72) Inventors: Eric Michael Bloomcamp, Olathe, KS (US); Khalid Mohamed Medhat, Overland Park, KS (US); Shane Robert Werner, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 13/769,268

(22) Filed: Feb. 15, 2013

(51) Int. Cl.
*H04W 76/02* (2009.01)
*H04M 1/60* (2006.01)
*H04M 1/57* (2006.01)

(52) U.S. Cl.
CPC ............ *H04W 76/02* (2013.01); *H04M 1/6091* (2013.01); *H04M 1/575* (2013.01); *H04M 2250/02* (2013.01)

(58) Field of Classification Search
CPC .......... H04M 1/6091; H04M 2250/02; H04M 1/575; H04M 1/6075
USPC .................... 455/569.2, 575.9, 99, 152.1, 345
See application file for complete search history.

(56) References Cited

U.S. PATENT DOCUMENTS

| | | |
|---|---|---|
| 6,622,083 B1 | 9/2003 | Knockeart et al. |
| 7,209,964 B2 | 4/2007 | Dugan et al. |
| 7,366,892 B2 | 4/2008 | Spaur et al. |
| 7,376,392 B2 | 5/2008 | Myojo |
| 7,454,473 B2 | 11/2008 | Suzuki |
| 7,912,224 B2 | 3/2011 | Lee et al. |
| 7,949,375 B2 | 5/2011 | Kortge |
| 7,966,111 B2 | 6/2011 | Moinzadeh et al. |
| 8,271,050 B2 | 9/2012 | Weiss |
| 8,484,707 B1 | 7/2013 | Bertz et al. |
| 8,527,164 B2 | 9/2013 | Staudinger et al. |
| 8,548,532 B1 | 10/2013 | Ng |
| 8,626,152 B2 | 1/2014 | Farrell et al. |
| 8,630,747 B2 | 1/2014 | Burcham et al. |
| 8,676,199 B2 | 3/2014 | Madhavan et al. |

(Continued)

FOREIGN PATENT DOCUMENTS

| | | |
|---|---|---|
| DE | 102011112546 A1 | 4/2014 |
| WO | 2013166418 A2 | 11/2013 |
| WO | 2013173331 A1 | 11/2013 |

OTHER PUBLICATIONS

Office Action dated Feb. 5, 2014, U.S. Appl. No. 13/218,503, filed Aug. 26, 2011.

(Continued)

*Primary Examiner* — Mazda Sabouri
*Assistant Examiner* — Edward Zhang

(57) ABSTRACT

Embodiments relate generally to systems and methods for receiving communication on a head unit, wherein the communication may be sent to a mobile device coupled to the head unit. The head unit may be enabled to receive communication sent to the mobile device by an application on the head unit, wherein the application may communicate with the network in communication with the mobile device. The head unit may be operable to receive communication sent to a plurality of mobile devices, wherein the head unit may prioritize the received communication. Communication sent to the mobile device and/or head unit may comprise calls, messages, emails, and/or data.

18 Claims, 8 Drawing Sheets

(56) References Cited

U.S. PATENT DOCUMENTS

| | | | |
|---|---|---|---|
| 8,750,942 B1 | 6/2014 | Ng | |
| 8,787,949 B2 * | 7/2014 | Sumcad et al. | 455/466 |
| 9,002,574 B2 | 4/2015 | Garrett et al. | |
| 9,031,498 B1 | 5/2015 | Bertz et al. | |
| 9,032,547 B1 | 5/2015 | Hohler et al. | |
| 9,110,774 B1 | 8/2015 | Bonn et al. | |
| 2003/0096641 A1 | 5/2003 | Odinak | |
| 2003/0120601 A1 | 6/2003 | Ouye et al. | |
| 2003/0224840 A1 | 12/2003 | Frank et al. | |
| 2004/0083041 A1 | 4/2004 | Skeen et al. | |
| 2004/0125957 A1 | 7/2004 | Rauber et al. | |
| 2004/0157650 A1 | 8/2004 | Wissinger et al. | |
| 2005/0021744 A1 | 1/2005 | Haitsuka et al. | |
| 2005/0065779 A1 | 3/2005 | Odinak | |
| 2005/0113102 A1 | 5/2005 | Kwon et al. | |
| 2006/0059480 A1 | 3/2006 | Kimoto | |
| 2006/0168578 A1 | 7/2006 | Vorlicek | |
| 2007/0028220 A1 | 2/2007 | Miller et al. | |
| 2007/0086579 A1 * | 4/2007 | Lorello et al. | 379/45 |
| 2007/0113269 A1 | 5/2007 | Zhang | |
| 2007/0124043 A1 | 5/2007 | Ayoub et al. | |
| 2007/0124045 A1 | 5/2007 | Ayoub et al. | |
| 2007/0124046 A1 | 5/2007 | Ayoub et al. | |
| 2007/0160199 A1 | 7/2007 | Sekiguchi et al. | |
| 2007/0288423 A1 | 12/2007 | Kimoto | |
| 2008/0034126 A1 | 2/2008 | Baker | |
| 2008/0072047 A1 | 3/2008 | Sarikaya et al. | |
| 2008/0148374 A1 | 6/2008 | Spaur et al. | |
| 2008/0289018 A1 | 11/2008 | Kawaguchi | |
| 2008/0289044 A1 | 11/2008 | Choi | |
| 2008/0307086 A1 | 12/2008 | Brooks et al. | |
| 2009/0028082 A1 | 1/2009 | Wynn et al. | |
| 2009/0049119 A1 | 2/2009 | Marcinkiewicz et al. | |
| 2009/0109941 A1 | 4/2009 | Carter | |
| 2009/0217036 A1 | 8/2009 | Irwin et al. | |
| 2010/0097239 A1 | 4/2010 | Campbell et al. | |
| 2010/0136944 A1 | 6/2010 | Taylor et al. | |
| 2010/0197362 A1 | 8/2010 | Saitoh et al. | |
| 2010/0220250 A1 | 9/2010 | Vanderwall et al. | |
| 2010/0234071 A1 | 9/2010 | Shabtay et al. | |
| 2010/0235285 A1 | 9/2010 | Hoffberg | |
| 2010/0260350 A1 | 10/2010 | Chutorash et al. | |
| 2010/0285787 A1 * | 11/2010 | Matsuda | 455/418 |
| 2011/0009107 A1 | 1/2011 | Guba et al. | |
| 2011/0090908 A1 | 4/2011 | Jacobson et al. | |
| 2011/0099316 A1 | 4/2011 | Tseng et al. | |
| 2011/0252415 A1 | 10/2011 | Ricci | |
| 2011/0257973 A1 | 10/2011 | Chutorash et al. | |
| 2011/0263293 A1 | 10/2011 | Blake et al. | |
| 2011/0295444 A1 | 12/2011 | Westra et al. | |
| 2011/0310731 A1 | 12/2011 | Park et al. | |
| 2012/0109406 A1 | 5/2012 | Yousefi et al. | |
| 2012/0134497 A1 | 5/2012 | Roitshtein et al. | |
| 2012/0159638 A1 | 6/2012 | McDade, Sr. | |
| 2012/0167071 A1 | 6/2012 | Paek | |
| 2012/0183221 A1 | 7/2012 | Alasry et al. | |
| 2012/0203557 A1 | 8/2012 | Odinak | |
| 2012/0282895 A1 | 11/2012 | Bai et al. | |
| 2012/0324046 A1 | 12/2012 | Park | |
| 2013/0205026 A1 | 8/2013 | Ricci | |
| 2013/0218400 A1 | 8/2013 | Knoop et al. | |
| 2013/0226391 A1 | 8/2013 | Nordbruch et al. | |
| 2013/0297456 A1 | 11/2013 | Annan et al. | |
| 2014/0053261 A1 | 2/2014 | Gupta et al. | |
| 2014/0068010 A1 | 3/2014 | Nicholson et al. | |
| 2014/0087760 A1 | 3/2014 | Bennett | |
| 2014/0222298 A1 | 8/2014 | Gurin | |

OTHER PUBLICATIONS

Ng, Sei Y., Patent Application entitled "Head Unit to Handset Interface and Integration," filed Aug. 20, 2013, U.S. Appl. No. 13/971,658.

Bloomcamp, Eric M., et al., Patent Application entitled Authenticating Mobile Device for on Board Diagnostic System Access, filed Sep. 23, 2013, U.S. Appl. No. 14/034,475.

Advisory Action dated Aug. 1, 2013, U.S. Appl. No. 13/218,503, filed Aug. 26, 2011.

Notice of Allowance dated Aug. 26, 2013, U.S. Appl. No. 13/471,107, filed May 14, 2012.

First Action Interview Pre-Communication dated Aug. 21, 2012, U.S. Appl. No. 13/218,503, filed Aug. 26, 2011.

First Action Interview Office Action dated Jan. 3, 2013, U.S. Appl. No. 13/218,503, filed Aug. 26, 2011.

Final Office Action dated May 7, 2013, U.S. Appl. No. 13/218,503, filed Aug. 26, 2011.

First Action Interview Pre-Interview Communication dated Oct. 26, 2012, U.S. Appl. No. 13/156,438, filed Jun. 9, 2011.

Notice of Allowance dated Feb. 26, 2013, U.S. Appl. No. 13/156,438, filed Jun. 9, 2011.

First Action Interview Pre-Communication dated Jan. 31, 2012, U.S. Appl. No. 13/246,554, filed Sep. 27, 2011.

FAIPP Office Action dated May 21, 2012, U.S. Appl. No. 13/246,554, filed Sep. 27, 2011.

Final Office Action dated Sep. 5, 2012, U.S. Appl. No. 13/246,554, filed Sep. 27, 2011.

Advisory Action dated Nov. 2, 2012, U.S. Appl. No. 13/246,554, filed Sep. 27, 2011.

Office Action dated Dec. 5, 2012, U.S. Appl. No. 13/246,554, filed Sep. 27, 2011.

Notice of Allowance dated May 20, 2013, U.S. Appl. No. 13/246,554, filed Sep. 27, 2011.

Office Action dated Mar. 13, 2013, U.S. Appl. No. 13/471,107, filed May 14, 2012.

Aboda, B., et al., "Exentsible Authentication Protocol (EAP)", Network Working Group, RFC 3748, Standards Track, Jun. 2004.

Shipley, Trevor D., et al. Patent Application entitled "Mobile Communication System Identity Pairing," filed Aug. 26, 2011, U.S. Appl. No. 13/218,503.

Bertz, Lyle T., et al., Patent Application entitled "Secure Changing Auto-Generated Keys for Wireless Access," filed Jun. 9, 2011, U.S. Appl. No. 13/156,438.

Ng, Sei Y., Patent Application entitled "Head Unit to Handset Interface and Integration," filed Sep. 27, 2011, U.S. Appl. No. 13/246,554.

Bertz, Lyle T., et al. Patent Application entitled "Automotive Multi-Generation Connectivity," filed Apr. 26, 2011, U.S. Appl. No. 13/094,494.

Annan, Brandon C., et al. Patent Application entitled "Methods and Systems of Digital Rights Management for Vehicles," filed May 3, 2012, U.S. Appl. No. 13/463,799.

Burcham, Robert H., et al. Patent Application entitled "In-car Head unit Wireless Communication Service Subscription Initialization," filed Apr. 24, 2012, U.S. Appl. No. 13/455,121.

Burcham, Robert H., et al. Patent Application entitled "Alternative Authorization for Telematics," filed May 14, 2012, U.S. Appl. No. 13/471,107.

Bonn, Michael J., et al. Patent Application entitled "System and Method of Utilizing Driving Profiles via a Mobile Device," filed Mar. 15, 2012, U.S. Appl. No. 13/844,226.

Foreign Communication From a Related Counterpart Application, International Search Report and Written Opinion dated Jun. 13, 2013, International Application No. PCT/US13/40940 filed on May 14, 2013.

Foreign Communication From a Related Counterpart Application, International Search Report and Written Opinion dated Dec. 23, 2013, International Application No. PCT/US13/39514 filed on May 3, 2013.

First Action Interview Pre-Communication dated Nov. 15, 2013, U.S. Appl. No. 13/791,658, filed Aug. 20, 2013.

Notice of Allowance dated Jan. 30, 2014, U.S. Appl. No. 13/791,658, filed Aug. 20, 2013.

Advisory Action dated Sep. 26, 2014, U.S. Appl. No. 13/218,503, filed Aug. 26, 2011.

Office Action dated Aug. 28, 2014, U.S. Appl. No. 13/094,494, filed Apr. 26, 2011.

(56) References Cited

OTHER PUBLICATIONS

Office Action dated Jul. 14, 2014, U.S. Appl. No. 13/661,536, filed Oct. 26, 2012.
Hohler, Rick A., et al., Patent Application entitled "Provisioning Vehicle based Digital Rights Management for Media Delivered via Phone," filed Oct. 26, 2012, U.S. Appl. No. 13/662,536.
Finnerty, Brian J., et al., Patent Application entitled "Method for Authenticating Driver for Registration of In-Vehicle Telematics Unit," filed Oct. 31, 2014, U.S. Appl. No. 14/530,667.
Foreign Communication From a Related Counterpart Application, International Preliminary Report on Patentability dated Nov. 13, 2014, PCT/US13/39514 filed on May 3, 2013.
Foreign Communication From a Related Counterpart Application, International Preliminary Report on Patentability dated Nov. 27, 2014, PCT/US13/40940 filed on May 14, 2013.
Notice of Allowance dated Dec. 3, 2014, U.S. Appl. No. 13/094,494, filed Apr. 26, 2011.
First Action Interview Pre-Communication dated Dec. 1, 2014, U.S. Appl. No. 13/844,226, filed Mar. 15, 2013.
Notice of Allowance dated Jan. 6, 2015, U.S. Appl. No. 13/661,536, filed Oct. 26, 2012.
Supplemental Notice of Allowance dated Jan. 30, 2015, U.S. Appl. No. 13/661,536, filed Oct. 26, 2012.
Final Office Action dated Jun. 16, 2014, U.S. Appl. No. 13/218,503, filed Aug. 26, 2011.
Office Action-Restriction Requirement dated May 7, 2014, U.S. Appl. No. 13/094,494, filed Apr. 26, 2011.
Restriction Requirement dated Mar. 19, 2015, U.S. Appl. No. 13/463,799, filed May 3, 2012.
Notice of Allowance dated Mar. 12, 2015, U.S. Appl. No. 13/844,226, filed Mar. 15, 2013.
Amireddy, Sridhar Reddy, et al., Patent Application entitled, "Vehicle Remote Operations Control," filed Apr. 28, 2015, U.S. Appl. No. 14/698,522.
First Action Interview Pre-Communication dated Jul. 9, 2015, U.S. Appl. No. 14/034,475, filed Sep. 23, 2013.
Restriction Requirement dated Sep. 4, 2015, U.S. Appl. No. 13/455,121, filed Apr. 24, 2012.

\* cited by examiner

DUAL PATH IN-VEHICLE COMMUNICATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Motor vehicles may now provide wireless communications based functionality. In an embodiment, a head unit may be installed in a motor vehicle that provides a variety of functionality that depends at least partly on wireless communications connectivity via a cellular network. For example, the head unit of a vehicle may be operable to communicate (wirelessly and/or via a cable or wire connection) with one or more mobile device within the vehicle, allowing for information transfer between the head unit and mobile device(s). Additionally, some motor vehicles and/or head units may be equipped with cellular communication capabilities and may be operable to execute communication applications.

SUMMARY

In an embodiment, a method for enabling an application of an in-vehicle head unit is disclosed. The method comprises: coupling a plurality of mobile devices to the head unit of a vehicle; initiating an application, wherein the application is executed by the head unit of the vehicle; enabling the head unit to receive communication sent to the mobile devices by sending a message to a network server defining an association between the head unit and the mobile devices, wherein communication directed to the numbers associated with the mobile devices is also directed to the head unit; and distinguishing priority for communication associated with the plurality of mobile devices that is received by the head unit.

In an embodiment, a method for operating an application of an in-vehicle head unit is disclosed. The method comprises: coupling at least one mobile device to the head unit of a vehicle; initiating an application, wherein the application is executed by the head unit of the vehicle; storing on the head unit information associated with the mobile device; uncoupling the mobile device from the head unit; and enabling the head unit to receive communication sent to the mobile device by sending a message to a network server defining an association between the head unit and the mobile device using the information stored on the head unit, wherein communication directed to the number associated with the mobile device is also directed to the head unit, and wherein the mobile device is not coupled to the head unit.

In an embodiment, a method for operating an application of an in-vehicle head unit is disclosed. The method comprises: detecting at least one mobile device by the head unit of a vehicle; initiating an application, wherein the application is executed by the head unit of the vehicle; enabling the head unit to receive communication sent to the mobile device by sending a message to a network server defining an association between the head unit and the mobile device using the information stored on the head unit, wherein communication directed to the number associated with the mobile device is also directed to the head unit; and disabling the application when the at least one mobile device is no longer detected by the head unit.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
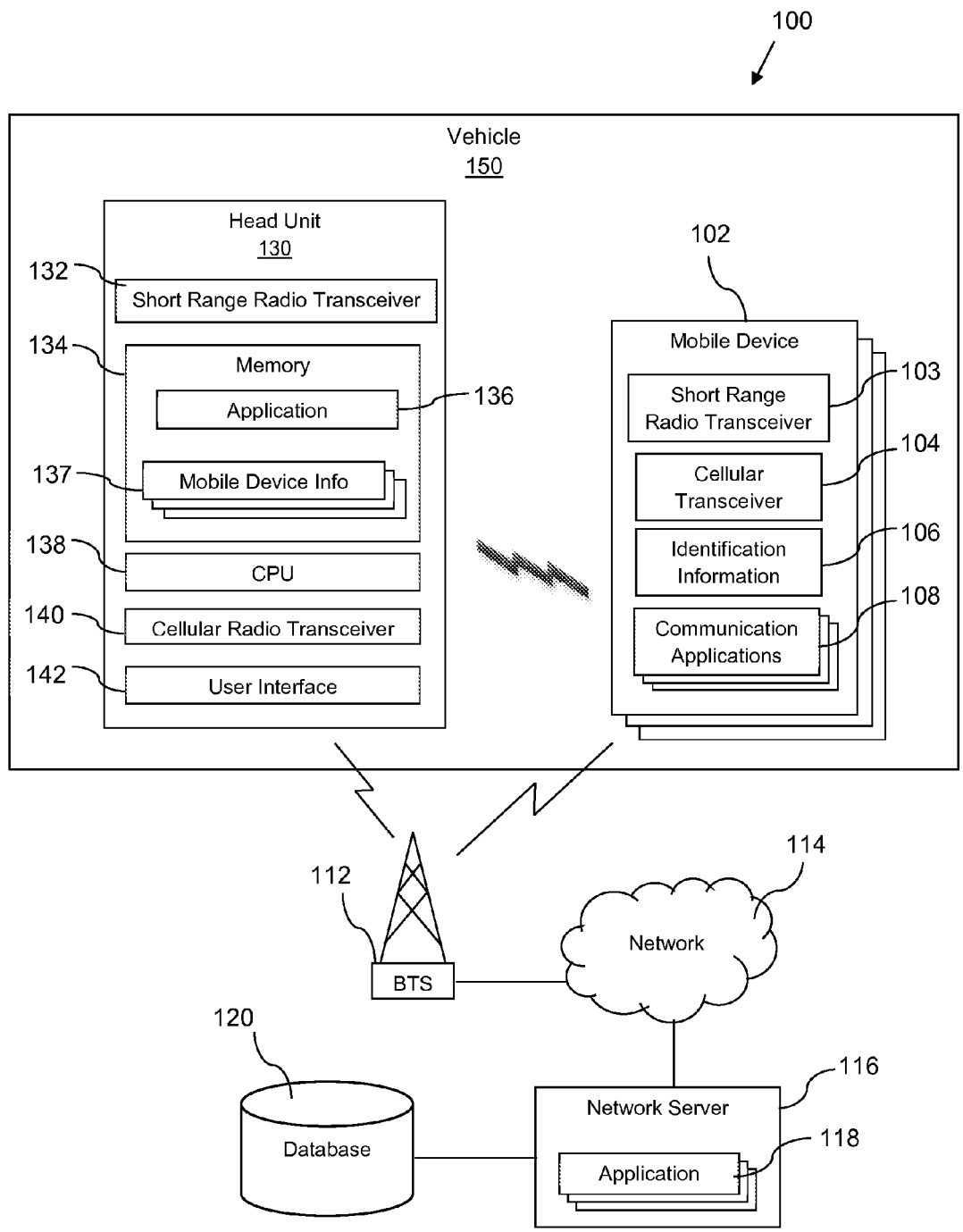
FIG. 1 is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Embodiments of the disclosure are directed to methods and systems for enabling an in-vehicle head unit to receive communication directed to a number (or numbers) associated with one or more mobile devices. As would be understood by one of ordinary skill in the art, a head unit may comprise an intelligent processor that monitors some vehicle systems and presents information about the vehicle to a user, for example presents information to a driver on a display panel in a dashboard of the vehicle. The head unit may further comprise one or more radio transceivers to enable various communication functionalities. The head unit may integrate a variety of functions comprising one or more of an audio system, a navigation system, a cellular communication system, a fuel consumption monitoring system, a maintenance schedule system, and other functions. The head unit may provide a user interface that promotes a user selecting functions and inputting control selections to the head unit. In an embodiment, a head unit may be a hardware item and/or an electronics box that is located within the vehicle, for example in or behind a dashboard, in an engine compartment, under a seat, in a trunk, or in some other location within the vehicle. In some contexts, the head unit may be referred to as a telematics unit.

The mobile device(s) may be detected by the head unit and may couple with the head unit, via Bluetooth® for example, and the mobile device(s) may communicate information to the head unit. The head unit may be equipped with cellular communication capabilities, and may be operable to receive communication, such as calls, messages, emails, and/or data. An application stored and executed by the head unit may enable the head unit to receive communication, where the communication may be sent directly to the head unit or may be directed from a separate device. For example, a user may wish to access communication sent to a mobile device using the interface system of the head unit of a vehicle. This may be accomplished by sending a message to a network server defining an association between the head unit and the mobile device, wherein communication directed to the number associated with the mobile device is also directed to the head unit.

In some cases, the head unit may receive communication (calls, messages, emails, and/or data) sent to one or more mobile devices, where the mobile devices may be coupled with the head unit. The mobile device may couple with the head unit, and an application on the head unit may enable the head unit to receive the communication sent to the coupled mobile device. The head unit may also be operable to couple with more than one mobile device (a plurality of devices) and may be enabled to receive communication sent to each of the plurality of mobile devices. In this case, the head unit may prioritize the communication it receives based on the order the mobile devices couple with the head unit. Alternatively, the priority may be determined based on user input to the head unit, where user input may be communicated via a user interface of the head unit.

In some cases, the head unit may be operable to receive communication sent to the mobile device, even if the mobile device is not coupled with the head unit. For example, a mobile device may couple with the head unit and communicate information about the mobile device to the head unit, which may then be stored in the memory of the head unit. Then, an application on the head unit may use the mobile device information to enable the head unit to receive communication sent to the mobile device. This may involve communicating with the network in communication with the mobile device, wherein the network may direct communication sent to the mobile device to the head unit. In some cases it may be necessary for the mobile device to be coupled with the head unit for the head unit to be able to receive communication sent to the mobile device. Alternatively, a user may initiate the application while the mobile device is not coupled to the head unit, therefore enabling the head unit to receive communication sent to the mobile device. For example, a user may not have their mobile device with them, but may wish to access communication sent to the mobile device. Additionally, the mobile device may have a low or dead battery, where a user may not be able to access communication using the mobile device. In cases such as these, the head unit may provide access to the communication which would otherwise not be accessible to the user.

Turning now to FIG. 1, a communication system 100 is described. In an embodiment, the system 100 comprises one or more mobile communication devices 102. The device 102 may comprise a short range radio transceiver 103, a cellular transceiver 104, identification information 106, and a plurality of communication applications 108. The device 102 may be configured to use the cellular transceiver 104 to establish a wireless communication link with a base transceiver station (BTS) 112, and the base transceiver station 112 may provide communications connectivity of the device 102 to a network 114. The network 114 may comprise any combination of private and public networks.

It is understood that the system 100 may comprise any number of mobile communication devices 102 and any number of base transceiver stations 112. The collectivity of base transceiver stations 112 may be said to comprise a radio access network, in that these base transceiver stations 112 may provide radio communication links to the mobile communication devices 102 to provide access to the network 114. The radio access network may be abstracted in different ways and may comprise, in addition to the base transceiver stations 112, servers and data stores such as home location registers (HLRs) or servers that implement the functionality of home location registers, visitor location registers (VLRs) or servers that implement the functionality of visitor location registers, base station controllers (BSCs), mobile switching centers (MSCs), and other network nodes that are specifically associated with providing wireless access and connectivity to the mobile communication devices 102. As shown in FIG. 1, the system 100 may comprise a network server 116 and a database 120 in communication with the network server 116.

The cellular transceiver 104 of the mobile device 102 may communicate with the base transceiver station 112 using any of a variety of wireless communication protocols including a code division multiple access (CDMA) wireless communication protocol, a global system for mobile communication (GSM) wireless communication protocol, a long-term evolution (LTE) wireless communication protocol, a world-wide interoperability for microwave access (WiMAX) wireless communication protocol, or another wireless communication protocol. The device 102 may be any of a mobile phone, a personal digital assistant (PDA), a media player, a wireless enabled computer, or other mobile communication device. In an embodiment, the mobile communication device 102 may have other components (not shown) such as a near field communication (NFC) radio transceiver, a wireless local area network (WLAN) radio transceiver, or other components.

The communication applications 108 of the mobile device 102 may comprise a voice communication application, a data communication application, a web browser application, an email application, a short message system (SMS) or texting application, a multimedia message system (MMS) application, and other communication applications. The communication applications 108 may be standard communication applications that are delivered by an original equipment manufacturer (OEM) who assembles the mobile communication device 102. The communication applications 108 may be stored as firmware or software in a memory area of the mobile communication device 102.

The system 100 may also comprise a vehicle 150, wherein the vehicle 150 may be any of an automobile or car, a sports utility vehicle (SUV), a pick-up truck, a mini-van, a van, a truck, a delivery truck, a tractor of a tractor-trailer or "18-wheeler" combination, or other motorized vehicle. The vehicle 150 may comprise a head unit 130 installed that provides a centralized electronic communication capability. The head unit 130 (also known as an in-vehicle computer system and/or a telematics unit) may be operable to communicate with the one or more mobile device 102 using a short range radio transceiver 132 of the head unit 130 and a short range radio transceiver 103 of the mobile device 102. The head unit 130 may communicate with the mobile device 102 using any of a variety of wireless communication protocols, for example a WiFi radio transceiver, a Bluetooth® radio transceiver, a ZigBee® radio transceiver, a near-field-communication (NFC) radio transceiver, and/or other radio transceivers.

As shown in FIG. 1, the one or more mobile device 102 may be located within the vehicle 150 when in communication with the head unit 130. The head unit 130 may also comprise a non-transitory memory 134, a processor 138, a cellular radio transceiver 140, and an optional user interface 142, wherein the cellular radio transceiver 140 may provide communication with the base transceiver station 112. In an embodiment, the cellular radio transceiver 140 may be located within the head unit 130, while in other embodiments, the cellular radio transceiver 140 may be located elsewhere within the vehicle 150, in communication with the head unit 130.

In an embodiment, the head unit 130 may be operable to detect (and optionally couple with) one or more mobile devices 102 located within the vehicle 150, wherein the head unit 130 may automatically couple to one or more detected mobile device 102. Alternatively, a user may choose to manually couple the head unit 130 with one or more mobile device 102, and in some embodiments, the head unit 130 may be operable to couple with only one mobile device 102 at a time. A device may be considered "coupled" to the head unit 130 if there is a wireless communication link between them or if the device is detectable by the head unit 130. For example, the mobile device 102 may establish a communication link with the head unit 130, wherein this link may, in some embodiments, only occur when the mobile device initially enters the vehicle 150. Alternatively, the link may be persistent or intermittent while the mobile device 102 is located within the vehicle 150, wherein the head unit 130 may observe the presence of the mobile device 102 for the duration of time that the mobile device 102 is located within the vehicle 150. Additionally, the link may be broken when the mobile device 102 leaves the vehicle 150.

The non-transitory memory 134 of the head unit 130 may comprise an application 136 that, when executed by the processor 138, may enable the head unit 130 to receive communication via the cellular radio transceiver 140. In an embodiment, the application 136 may enable the head unit 130 to receive communication that is sent to a number of the one or more mobile device 102, wherein the communication may be directed to both the head unit 130 and the mobile device 102. In some embodiments, the application may be initiated if the mobile device 102 is coupled with the head unit 130. In an embodiment, communication sent to the mobile device 102 may comprise calls, messages, emails and/or data, or other communication such as that provided by the communication applications 108 of the mobile device 102 as described above. The application 136 may be operable to communicate with the network 114 and/or network sever 116 in communication with the mobile device 102, wherein the network sever 116 may comprise one or more application 118 operable to control the direction of communication to the head unit 130 and/or the mobile device 102. A message containing information (such as phone numbers) associated with the head unit 130 and the one or more mobile device 102 may be sent to the network server 116 from the application 136 of the head unit 130. Then, in response to receipt of the message, the application 118 of the network server 116 may create an entry for a table in a routing database 120 associating the head unit 130 and the mobile device 102. Thus the number of the mobile device 102 may be considered "dual-registered" to the mobile device 102 and the head unit 130. Therefore, enabling the head unit 120 to receive communication sent to the mobile device 102 may be accomplished in part by the application 136 on the head unit 130 as well as the application 118 in the network server 116.

When communication (such as calls, messages, emails, and/or data) intended for the number of the mobile device 102 is directed through the network 114, the network server 116 may consult the routing database 120, wherein the entry in the database table may indicate that communication sent to the mobile device 102 should also be directed to the head unit 130. In an embodiment, a user may choose to have communication directed to both the head unit 130 and the mobile device 102, and a user may also choose to have communication directed to only one of the head unit 130 or the mobile device 102. Additionally, a user may specify by type of communication, such as calls, messages, emails, and/or data, where the communication is to be directed between the head unit 130 and the mobile device 102. For example, a user may choose to automatically receive some or all of the different types of communication intended for the number of the mobile device 102 on either the mobile device 102 or the head unit 130.

In an embodiment, the head unit 130 may receive mobile device information 137 from one or more coupled mobile devices 102, wherein the mobile device information 137 may be stored in the memory 134 of the head unit 130. Mobile device information 137 may comprise numbers, email addresses, social media accounts, contacts, call history, as well as other user information associated with (or stored on) the mobile device 102. The application 136 of the head unit 130 may be operable to access the stored mobile device information 137 and associate the information 137 with the head unit 130 in a message sent to the network server 116 to enable the head unit 130 to receive communication sent to the number associated with the mobile device 102, as described above. This may allow a user to receive communication sent to the number of the mobile device 102 whether or not the mobile device 102 is coupled with the head unit 130.

In an embodiment, the mobile device information 137 may also comprise identification information 106 associated with the mobile device(s) 102, wherein the identification information 106 of the mobile device 102 may be associated with a user of the mobile device 102. In an embodiment, the user of the mobile device 102 may be a driver and/or passenger of the vehicle 150. In an embodiment, the head unit 130 may utilize the mobile device information 137 when the mobile device 102 is not coupled to the head unit 130. For example, a user may manually initiate the application 136, wherein the application 136 may access the mobile device information 137 and enable the head unit 130 to receive communication sent to the mobile device 102, even if the mobile device 102 is not coupled with the head unit 130. The mobile device 102 may not be coupled to the head unit 130 if, for example, the user forgets or misplaces the mobile device 102, and/or the battery of the mobile device 102 is low or dead.

In another embodiment, the head unit 130 may be operable to detect one or more key fobs, wherein a key fob may be associated with a user of the vehicle 150. The user associated with the key fob may also be associated with a mobile device 102 (via the identification information 106 of the mobile device 102), wherein mobile device information 137 from the mobile device 102 may be stored on the head unit 130. In an embodiment, the head unit 130 may associate the key fob with mobile device information 137 stored in the head unit 120 and therefore may be enabled to receive communication sent to the mobile device 102, even if the mobile device 102 is not coupled with the head unit 130. Said in other words, individual key fobs may be used to initiate the link to the head unit 130 for a specific user, e.g., the user associated with the individual key fob.

The user interface 142 of the head unit 130 may, in some embodiments, comprise a display, an input system, a speaker system, and a microphone. In some embodiments, the display may comprise a screen, and the input system may comprise a keypad and/or a touch screen, for example. The speaker system may communicate audio (such as media or messages) to a user of the vehicle 150. The microphone may receive voice commands or messages from a user of the vehicle 150 and may, in some embodiments, communicate voice commands from the user to the application 136. In some embodiments, voice commands from the user may be executed by the application 136 of the head unit 130 to perform tasks such as making a call, receiving a call, sending and/or receiving a message, using a navigation system, using a search engine, among other activities. In an embodiment, a user may utilize the user interface 142 to communicate with the head unit 130, for example, to initiate the execution of the application 136 and/or to communicate mobile device information 137 to the memory 134 of the head unit 130. Additionally, a user may receive communication from the head unit 130 via the user interface 142, such as messages, emails, contact information, caller identification, call history, internet access, etc.

Figure 2:
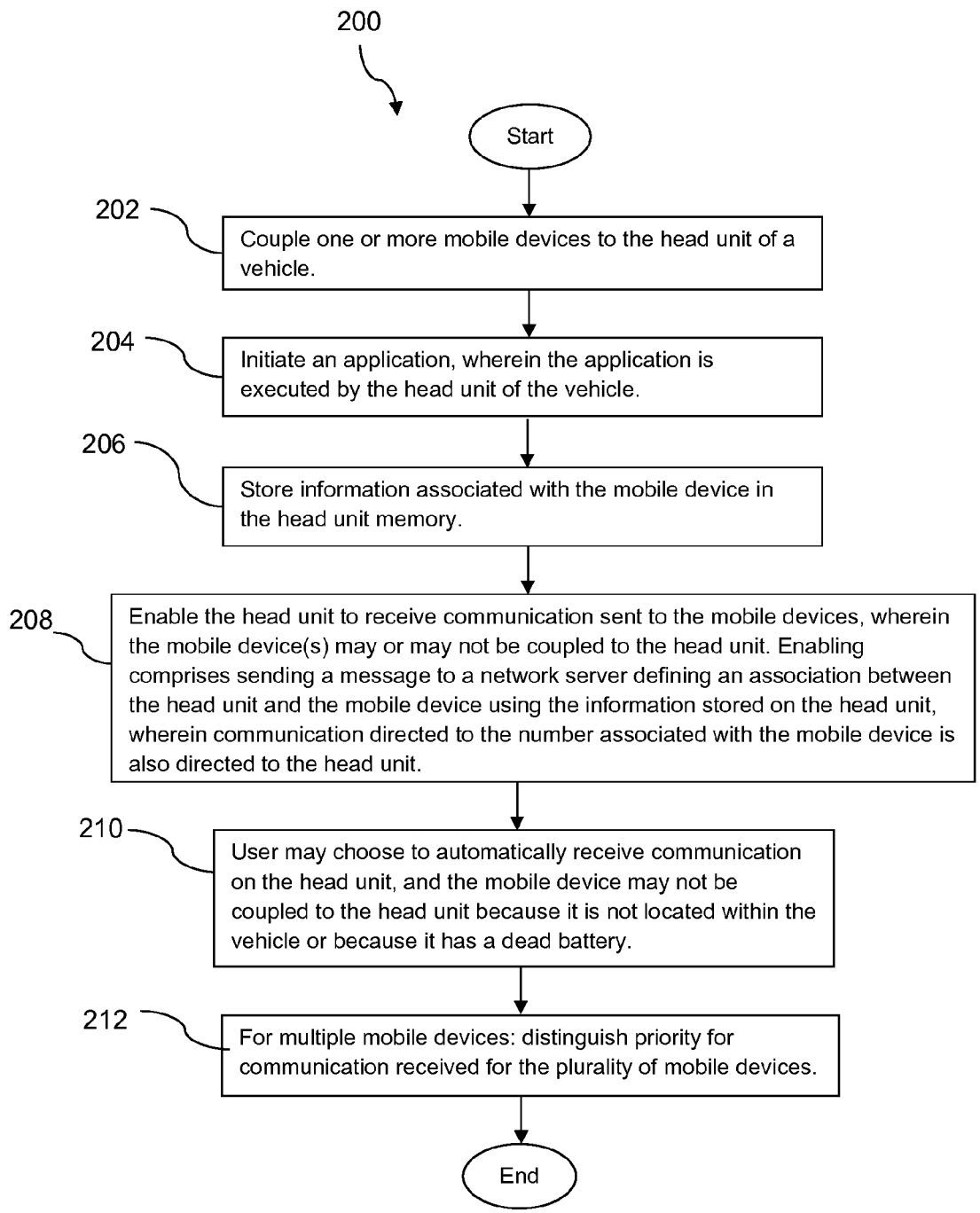
FIG. 2 is a flow chart illustrating a method according to an embodiment of the disclosure.

Turning now to FIG. 2, a method 200 is described. At block 202, the method 200 may comprise coupling one or more mobile devices to the head unit of a vehicle, wherein the mobile device(s) may be detected by the head unit when they enter the vehicle. At block 204, the method may comprise initiating an application, wherein the application may be executed by the head unit of the vehicle. The application may be initiated automatically based on the detection of the mobile device(s) and/or may be initiated manually by a user. At block 206, the method may further comprise storing information associated with the mobile device in the memory of the head unit where it may be accessed by the application. Information may comprise numbers, email addresses, social media accounts, contacts, call history, as well as other user information associated with (or stored on) the mobile device. At block 208, the method may comprise enabling the head unit to receive communication sent to the mobile devices, wherein the application of the head unit may be at least partly responsible for enabling the head unit. Enabling the head unit may comprise sending a message to a network server defining an association between the head unit and the mobile device using the information stored on the head unit, wherein communication directed to the number associated with the mobile device is also directed to the head unit. In some embodiments, the head unit may be enabled to receive communication sent to the mobile devices when the mobile device(s) may not be coupled to the head unit. For example, the mobile device may not be coupled to the head unit because it is not located within the vehicle or because it has a low or dead battery. Then, at block 210, the method may comprise the user choosing to automatically direct communication sent to the mobile device to the head unit (whether the mobile device is coupled to the head unit or not). This direction may be communicated in the message sent to the network server described above. In some embodiments, a plurality of mobile devices may be coupled to the head unit, wherein, at block 212, the method may further comprise distinguishing priority for communication received for the plurality of mobile devices.

Figure 3:
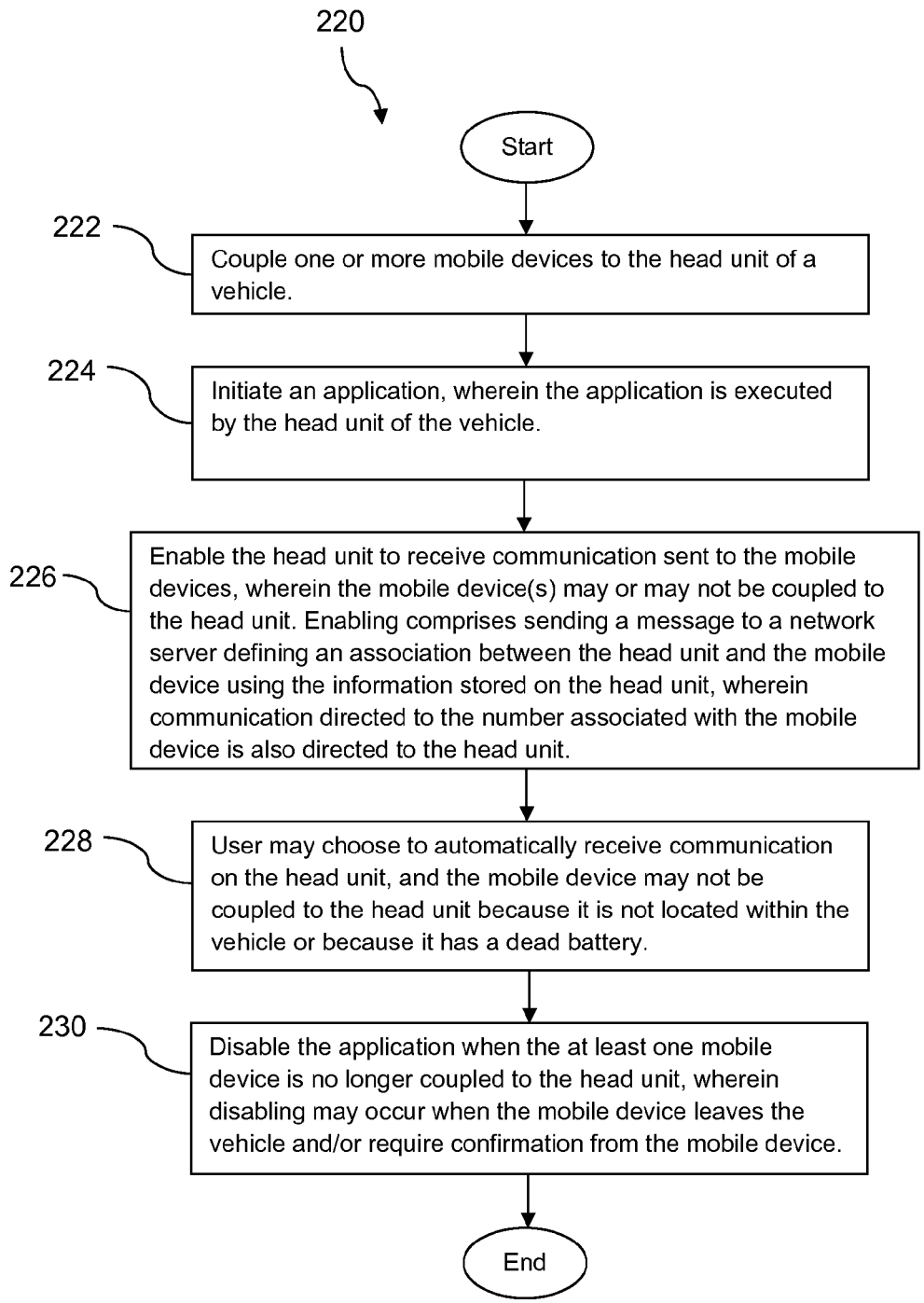
FIG. 3 is a flow chart illustrating a method according to an embodiment of the disclosure.

Turning now to FIG. 3, a method 220 is described. At block 222, the method 220 may comprise coupling at least one mobile device to the head unit of a vehicle, wherein the mobile device(s) may be detected by the head unit when they enter the vehicle. At block 224, the method may comprise initiating an application, wherein the application may be executed by the head unit of the vehicle. The application may be initiated automatically based on the detection of the mobile device(s) and/or may be initiated manually by a user. At block 226, the method may comprise enabling the head unit to receive communication sent to the mobile device, wherein the mobile device may or may not be coupled to the head unit. Enabling the head unit may comprise sending a message to a network server defining an association between the head unit and the mobile device using the information stored on the head unit, wherein communication directed to the number associated with the mobile device is also directed to the head unit. Then, at block 228, the method may comprise the user choosing to automatically receive communication on the head unit, wherein this direction may be communicated in the message sent to the network server. In an embodiment, the user may communicate (preferences, choices, etc.) with the head unit via a user interface. Then, at block 230, the method may comprise disabling the application when the at least one mobile device is no longer coupled to the head unit, wherein disabling may occur when the mobile device leaves the vehicle, and, in some embodiments, the disabling may require confirmation from the mobile device.

Figure 4:
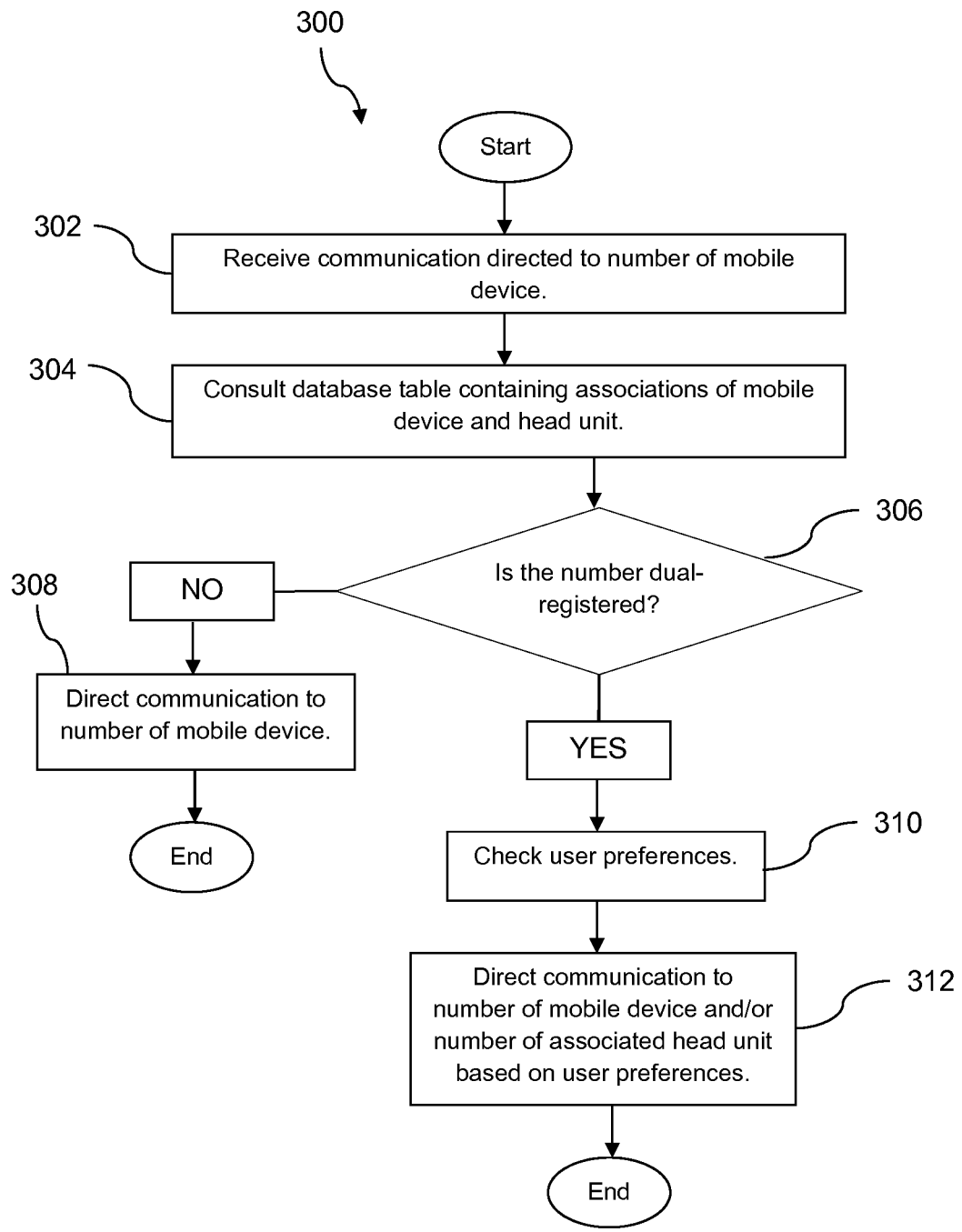
FIG. 4 is a flow chart illustrating another method according to an embodiment of the disclosure.

FIG. 4 depicts a method 300 that may be carried out in the network in communication with the mobile device and the head unit. At block 302, the network may receive communication (such as calls, messages, emails, and/or data) directed to a number associated with a mobile device. The network server may then, at block 304, consult a routing database table to search for the number of the mobile device. If it is discovered, at block 306, that the number is dual-registered in the database table (that is, communication is to be sent to more than one device), the network server will check user preferences stored in the table (at block 310) and then direct the communication to the number of the mobile device and/or the number of an associated head unit based on the user preferences (at block 312). In some embodiments, a user may define preferences for receiving communication on either of the devices, and these preferences may be based on type of communication. If it is discovered (at block 306) that the number is not dual-registered in the database table (that is, communication is only to be sent to the mobile device and/or the number is not present in the table), the network server will, at block 308, direct the communication to the number of the mobile device.

Figure 5:
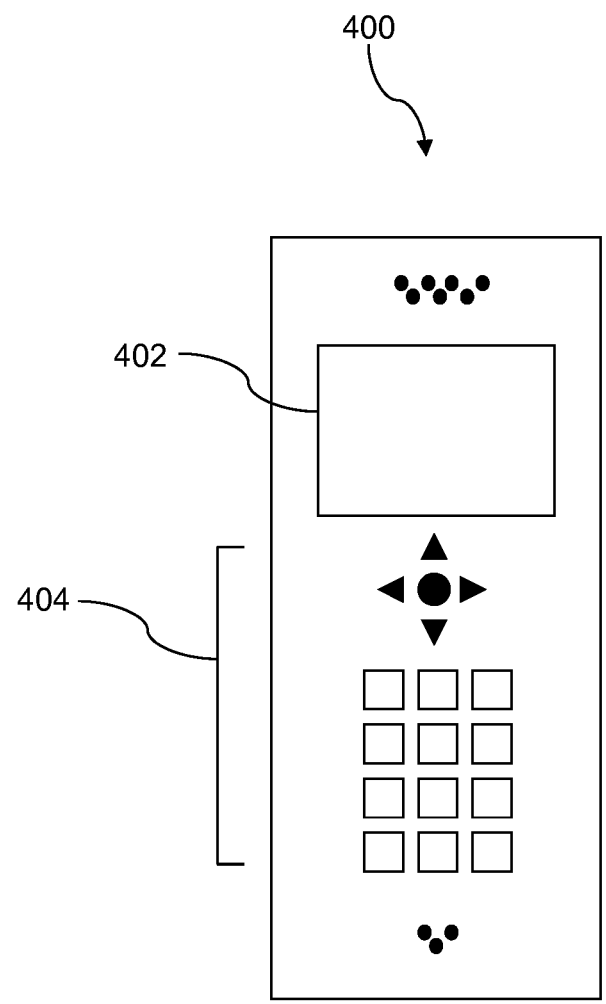
FIG. 5 is an illustration of a mobile communication device according to an embodiment of the disclosure.

FIG. 5 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400.

The mobile device 400 may execute a web browser application which enables the display 402 to show a web page. The web page may be obtained via wireless communications with a base transceiver station, a wireless network access node, a peer mobile device 400 or any other wireless communication network or system.

Figure 6:
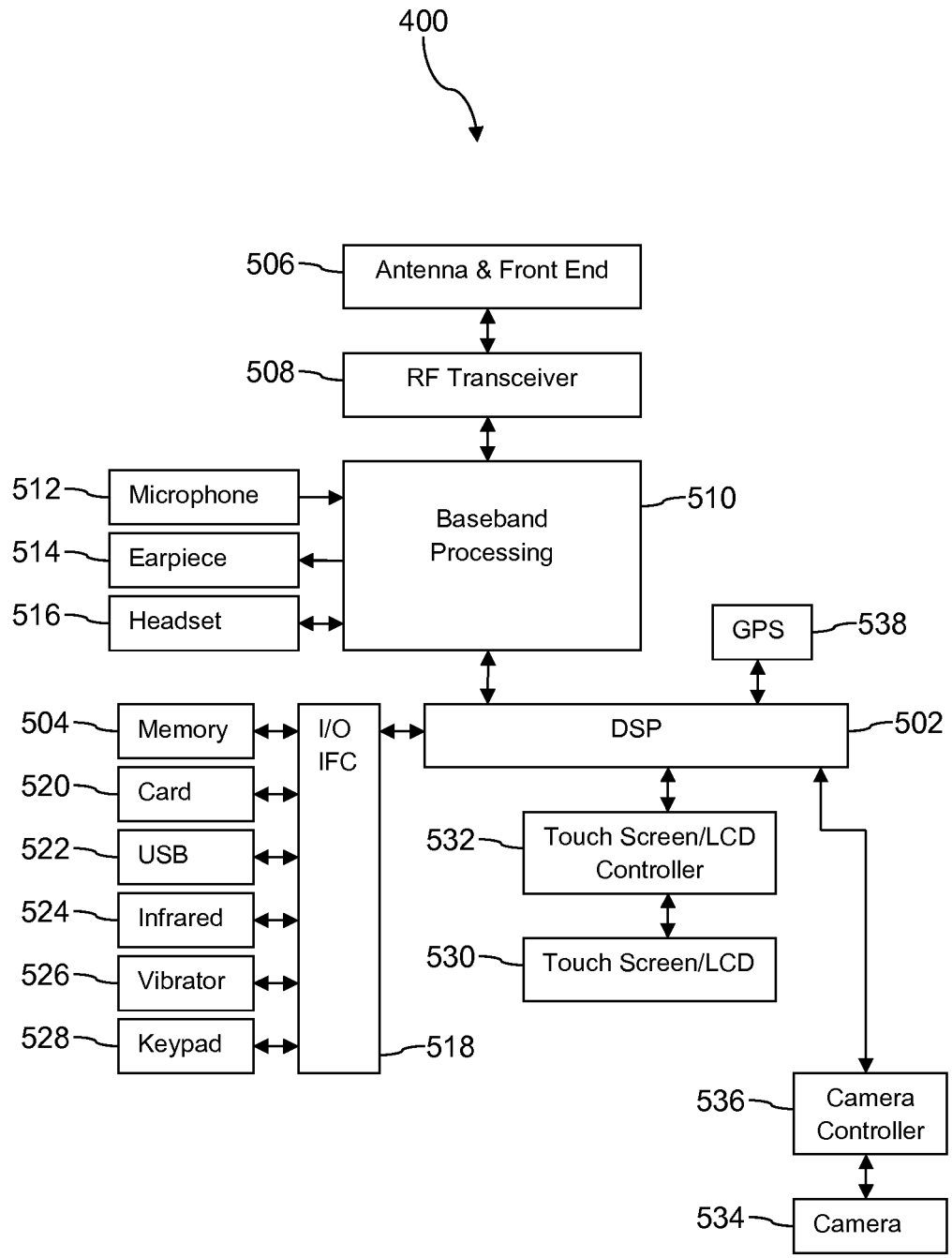
FIG. 6 is a block diagram of a mobile communication device according to an embodiment of the disclosure.

FIG. 6 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 7A:
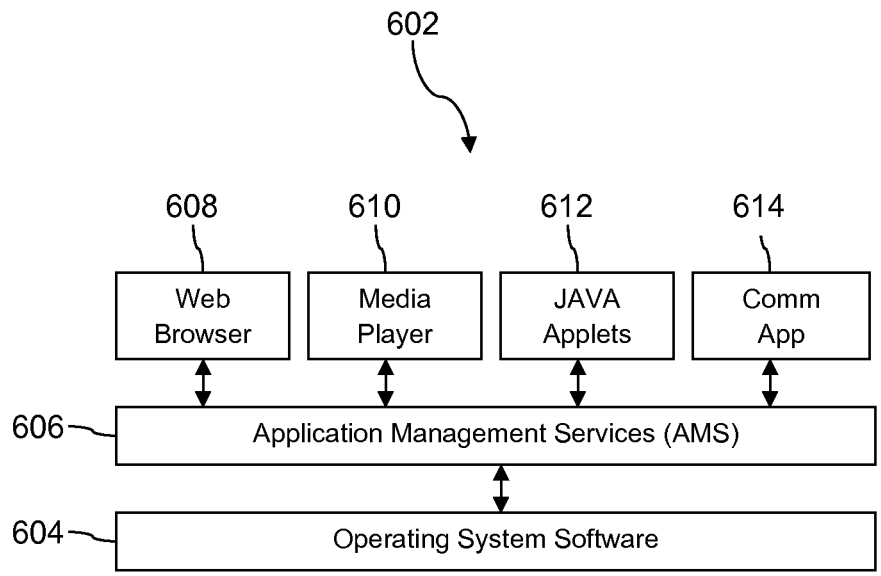
FIG. 7A is a block diagram of a software architecture of a mobile communication device according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 7B:
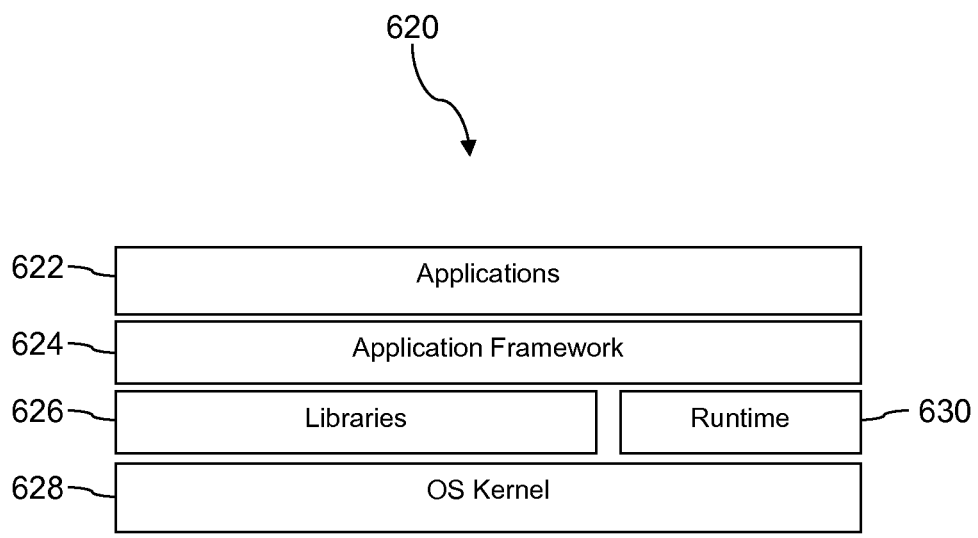
FIG. 7B is a block diagram of another software architecture of a mobile communication device according to an embodiment of the disclosure.

FIG. 7B illustrates an alternative software environment 620 that may be implemented by the DSP 502. The DSP 502 executes operating system software 628 (for example an operating system kernel) and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
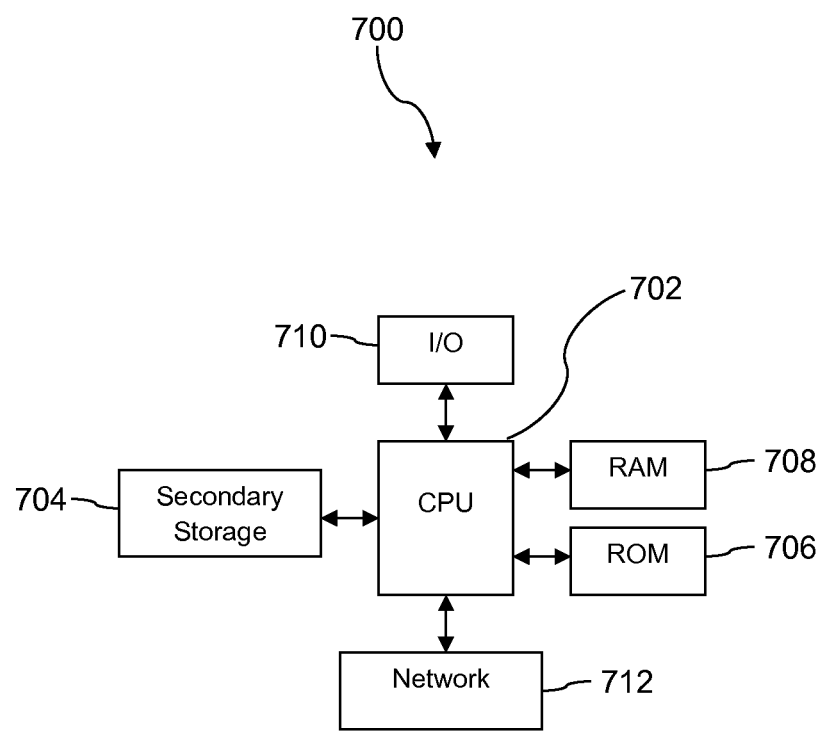
FIG. 8 illustrates an exemplary computer system suitable for implementing the several embodiments of the disclosure.

FIG. 8 illustrates a computer system 700 suitable for implementing one or more embodiments disclosed herein. The computer system 700 includes a processor 702 (which may be referred to as a central processor unit or CPU) that is in communication with memory devices including secondary storage 704, read only memory (ROM) 706, random access memory (RAM) 708, input/output (I/O) devices 710, and network connectivity devices 712. The processor 702 may be implemented as one or more CPU chips.

It is understood that by programming and/or loading executable instructions onto the computer system 700, at least one of the CPU 702, the RAM 708, and the ROM 706 are changed, transforming the computer system 700 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation.

Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 704 is typically comprised of one or more disk drives or tape drives and is used for non-volatile storage of data and as an over-flow data storage device if RAM 708 is not large enough to hold all working data. Secondary storage 704 may be used to store programs which are loaded into RAM 708 when such programs are selected for execution. The ROM 706 is used to store instructions and perhaps data which are read during program execution. ROM 706 is a non-volatile memory device which typically has a small memory capacity relative to the larger memory capacity of secondary storage 704. The RAM 708 is used to store volatile data and perhaps to store instructions. Access to both ROM 706 and RAM 708 is typically faster than to secondary storage 704. The secondary storage 704, the RAM 708, and/or the ROM 706 may be referred to in some contexts as computer readable storage media and/or non-transitory computer readable media.

I/O devices 710 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 712 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 712 may enable the processor 702 to communicate with the Internet or one or more intranets. With such a network connection, it is contemplated that the processor 702 might receive information from the network, or might output information to the network in the course of performing the above-described method steps. Such information, which is often represented as a sequence of instructions to be executed using processor 702, may be received from and outputted to the network, for example, in the form of a computer data signal embodied in a carrier wave.

Such information, which may include data or instructions to be executed using processor 702 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 702 executes instructions, codes, computer programs, scripts which it accesses from hard disk, floppy disk, optical disk (these various disk based systems may all be considered secondary storage 704), ROM 706, RAM 708, or the network connectivity devices 712. While only one processor 702 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 704, for example, hard drives, floppy disks, optical disks, and/or other device, the ROM 706, and/or the RAM 708 may be referred to in some contexts as non-transitory instructions and/or non-transitory information.

In an embodiment, the computer system 700 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 700 to provide the functionality of a number of servers that is not directly bound to the number of computers in the computer system 700. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 700, at least portions of the contents of the computer program product to the secondary storage 704, to the ROM 706, to the RAM 708, and/or to other non-volatile memory and volatile memory of the computer system 700. The processor 702 may process the executable instructions and/or data structures in part by directly accessing the computer program product, for example by reading from a CD-ROM disk inserted into a disk drive peripheral of the computer system 700. Alternatively, the processor 702 may process the executable instructions and/or data structures by remotely accessing the computer program product, for example by downloading the executable instructions and/or data structures from a remote server through the network connectivity devices 712. The computer program product may comprise instructions that promote the loading and/or copying of data, data structures, files, and/or executable instructions to the secondary storage 704, to the ROM 706, to the RAM 708, and/or to other non-volatile memory and volatile memory of the computer system 700.

In some contexts, the secondary storage 704, the ROM 706, and the RAM 708 may be referred to as a non-transitory computer readable medium or a computer readable storage media. A dynamic RAM embodiment of the RAM 708, likewise, may be referred to as a non-transitory computer readable medium in that while the dynamic RAM receives electrical power and is operated in accordance with its design, for example during a period of time during which the computer 700 is turned on and operational, the dynamic RAM stores information that is written to it. Similarly, the processor 702 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for enabling an application of an in-vehicle head unit comprising:
   coupling a plurality of mobile devices to the head unit of a vehicle;
   initiating an application, wherein the application is executed by the head unit of the vehicle;
   for each mobile device of the plurality of mobile devices, dual-registering a number corresponding to the mobile device of the plurality of mobile devices with both the mobile device and the head unit by sending a message to a network server defining an association between the head unit and the mobile device;
   in response to the dual registering and based on a user preference that a communication directed to the number associated with the mobile device be directed to both the mobile device and the head unit, receiving, by both the mobile device and the head unit, a communication directed to the number associated with the mobile device;
   distinguishing priority for communications associated with the plurality of mobile devices that are received by the head unit;
   uncoupling a first mobile device of the plurality of mobile devices from the head unit of the vehicle; and
   receiving, by both the first mobile device and the head unit, an incoming communication directed to a number associated with the first mobile device, wherein the first mobile device is not coupled to the head unit when the incoming communication is received by the head unit.

2. The method of claim 1 wherein the plurality of mobile devices and the head unit are coupled via Bluetooth.

3. The method of claim 1 wherein a user of one of the plurality of mobile devices chooses how to access the communication.

4. The method of claim 3 wherein the user chooses to automatically receive communication on the head unit.

5. The method of claim 1 wherein distinguishing priority for the plurality of mobile devices is completed based on the order that each of the plurality of mobile devices is coupled with the head unit.

6. The method of claim 1 wherein distinguishing priority for the plurality of mobile devices is completed based on user input.

7. The method of claim 6 wherein the head unit comprises a user interface and user input is completed using the user interface.

8. A method for operating an application of an in-vehicle head unit comprising:
   coupling at least one mobile device to the head unit of a vehicle;
   initiating an application, wherein the application is executed by the head unit of the vehicle;
   storing on the head unit information associated with the at least one mobile device;
   uncoupling the at least one mobile device from the head unit; and
   enabling the head unit to receive a communication sent to the at least one mobile device by sending a message to a network server defining an association between the head unit and the at least one mobile device using the information stored on the head unit, wherein the communication directed to the number associated with the at least one mobile device is directed to both the at least one mobile device and the head unit, and wherein the at least one mobile device is not coupled to the head unit when the communication is received by the head unit.

9. The method of claim 8 wherein the at least one mobile device is uncoupled from the head unit because the at least one mobile device is not located within the vehicle.

10. The method of claim 9 wherein a user chooses to automatically receive communication on the head unit and not on the at least one mobile device.

11. The method of claim 8 wherein the at least one mobile device is uncoupled from the head unit because the at least one mobile device does not have enough battery to receive communication.

12. The method of claim 11 wherein a user chooses to automatically receive communication on the head unit and not on the at least one mobile device.

13. The method of claim 8 wherein enabling the head unit to receive communication directed to the number associated with the at least one mobile device is completed using a user interface.

14. A method for operating an application of an in-vehicle head unit comprising:
   detecting at least one mobile device by the head unit of a vehicle;
   initiating an application, wherein the application is executed by the head unit of the vehicle;
   dual-registering a number corresponding to the at least one mobile device with both the at least one mobile device and the head unit by sending a message to a network server defining an association between the head unit and the at least one mobile device using the information stored on the head unit;

in response to the dual registering and based on a user preference that a communication directed to the number associated with the at least one mobile device be directed to both the at least one mobile device and the head unit, receiving, by both the at least one mobile device and the head unit, a communication directed to the number associated with the at least one mobile device;

uncoupling the at least one mobile device from the head unit of the vehicle; and receiving, by both the at least one mobile device and the head unit, an incoming communication directed to a number associated with the at least one mobile device, wherein the at least one mobile device is not coupled to the head unit when the incoming communication is received by the head unit.

15. The method of claim 14 wherein the communication comprises one or more of calls, messages, emails, or data sent to the at least one mobile device.

16. The method of claim 14 wherein the at least one mobile device comprises a plurality of mobile devices.

17. The method of claim 16 further comprising distinguishing priority for communications directed to the at least one mobile device that is received by the head unit.

18. The method of claim 14 wherein initiating the application occurs when the ignition of the vehicle is turned on.

* * * * *